Figure 1:
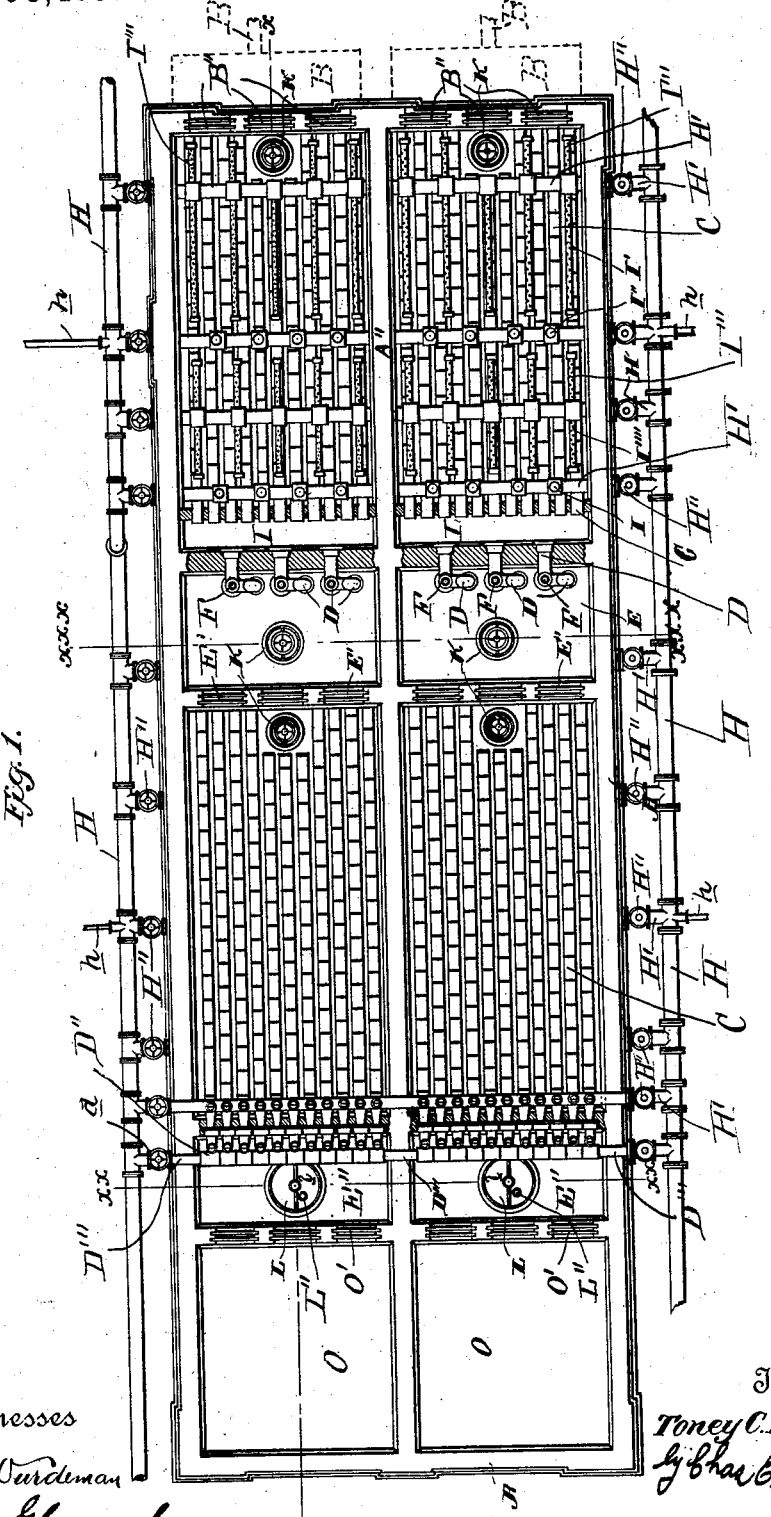

(No Model.)  5 Sheets—Sheet 1.

T. C. HEFEL.
FILTERING PLANT FOR WATERWORKS.

No. 603,483. Patented May 3, 1898.

Witnesses
E. C. Wurdeman
A. E. Glascock

Inventor
Toney C. Hefel
by Chas. E. Adamson
Attorney

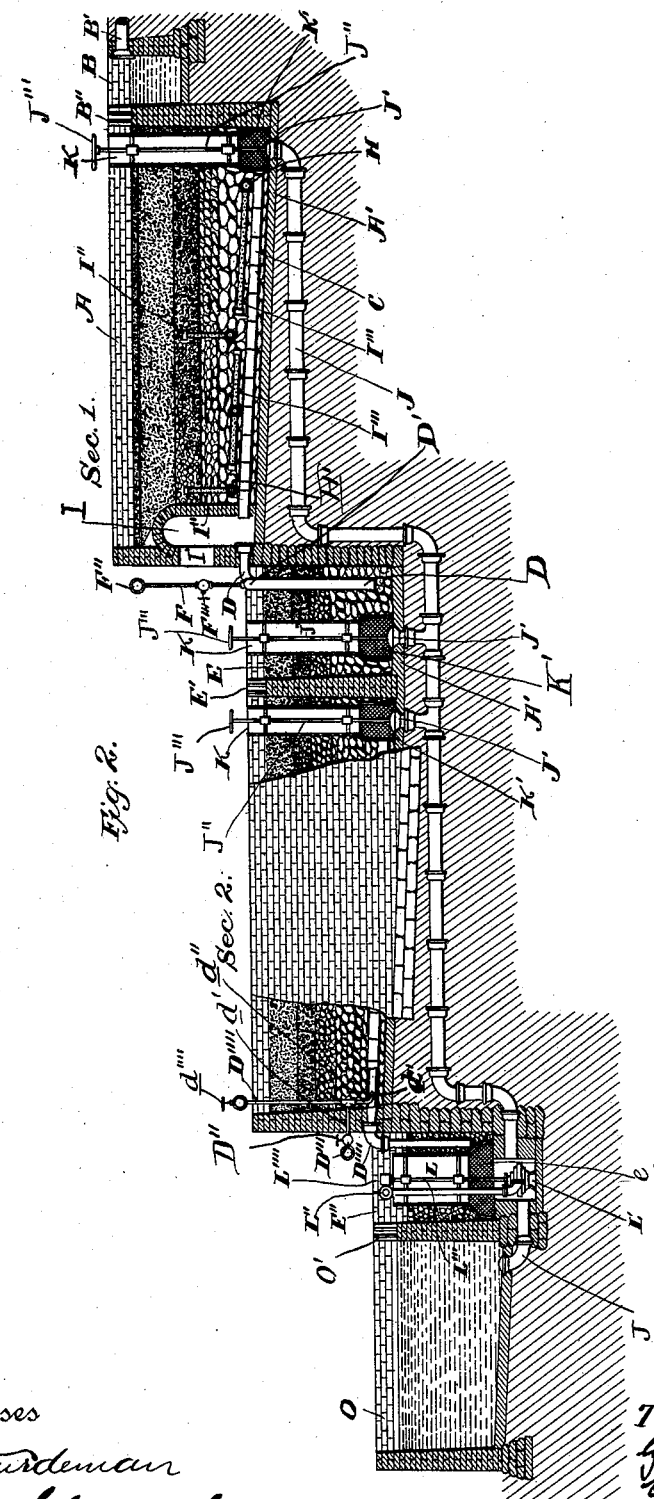

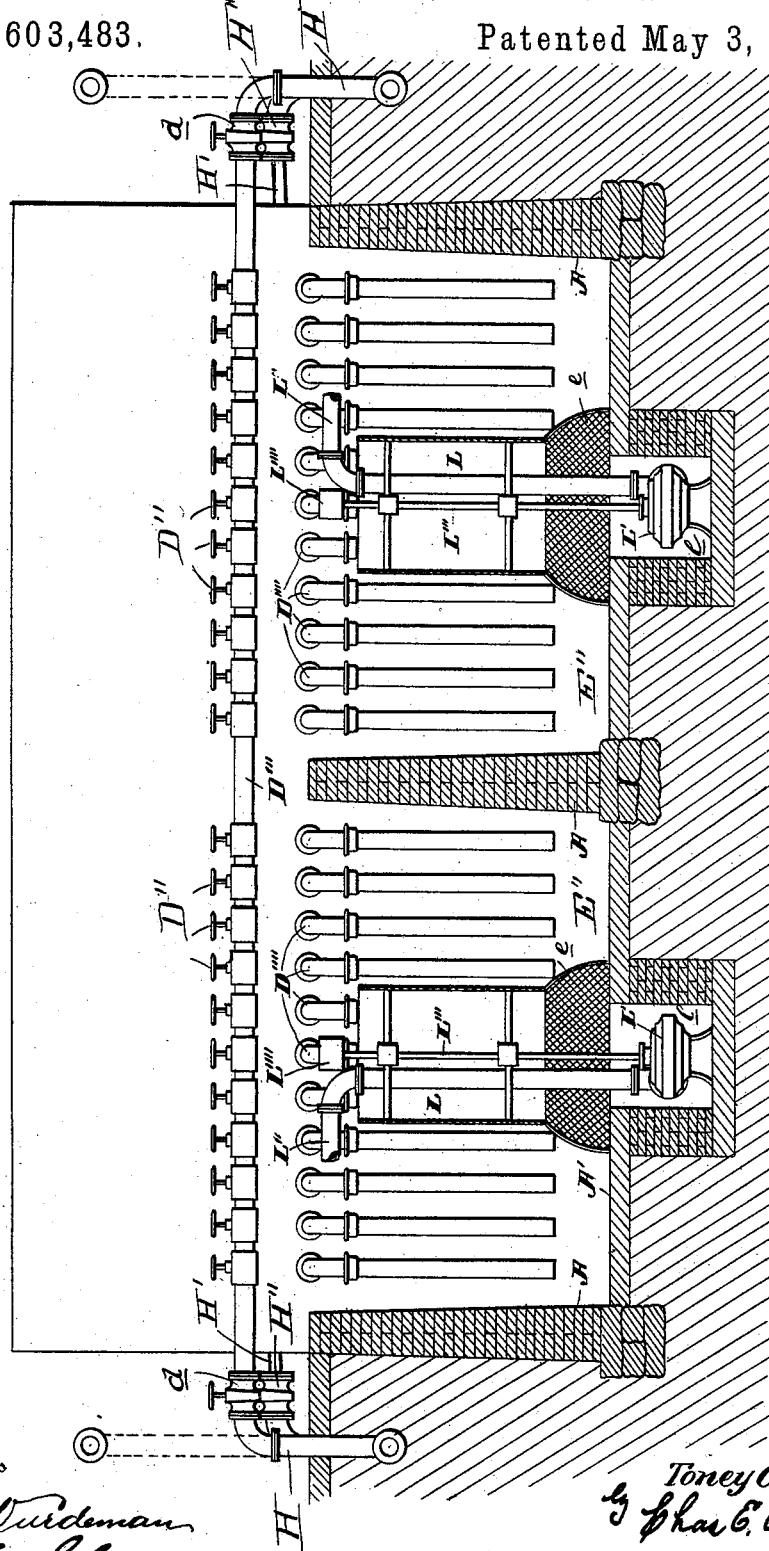

(No Model.) 5 Sheets—Sheet 4.
T. C. HEFEL.
FILTERING PLANT FOR WATERWORKS.
No. 603,483. Patented May 3, 1898.
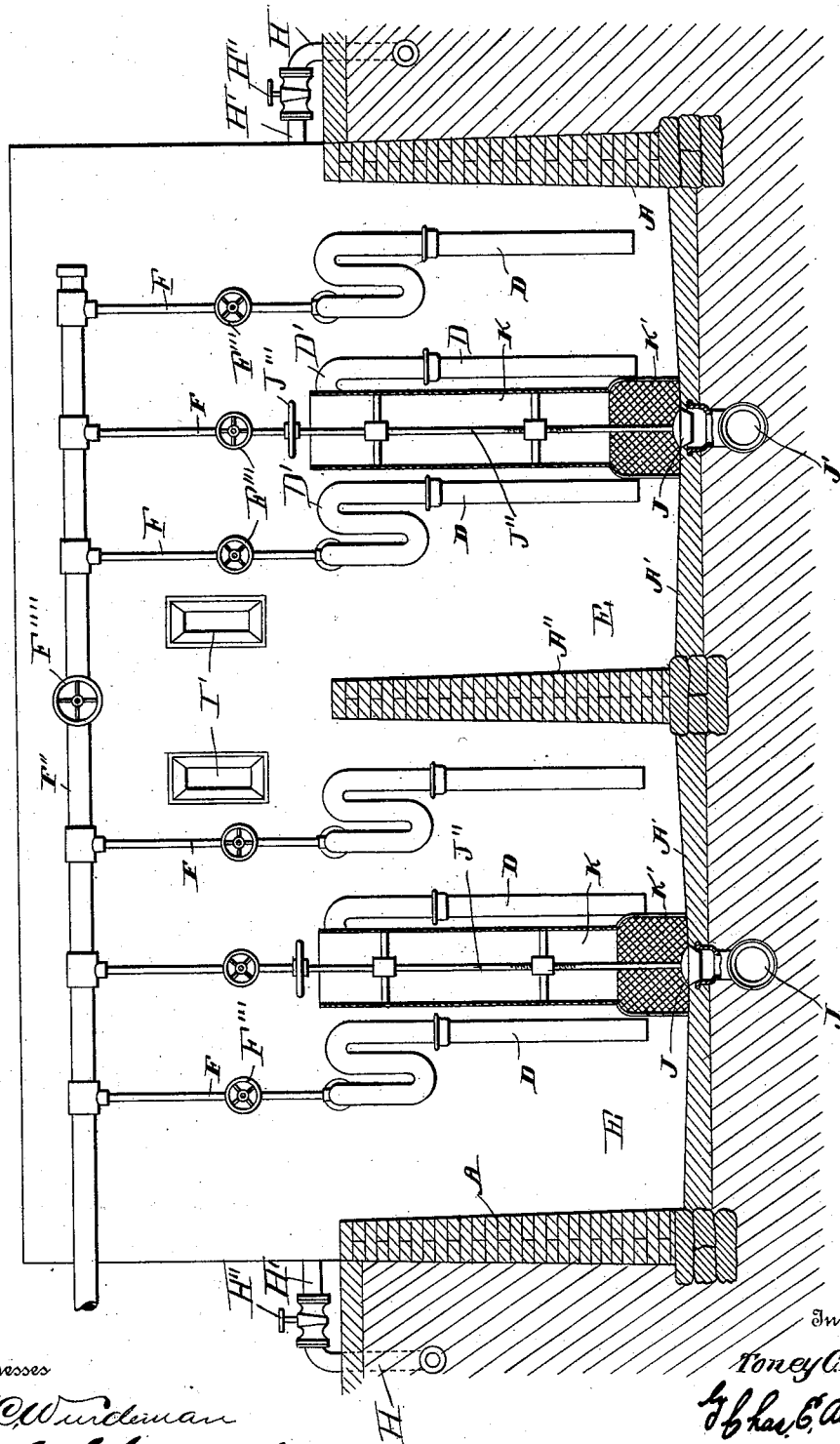

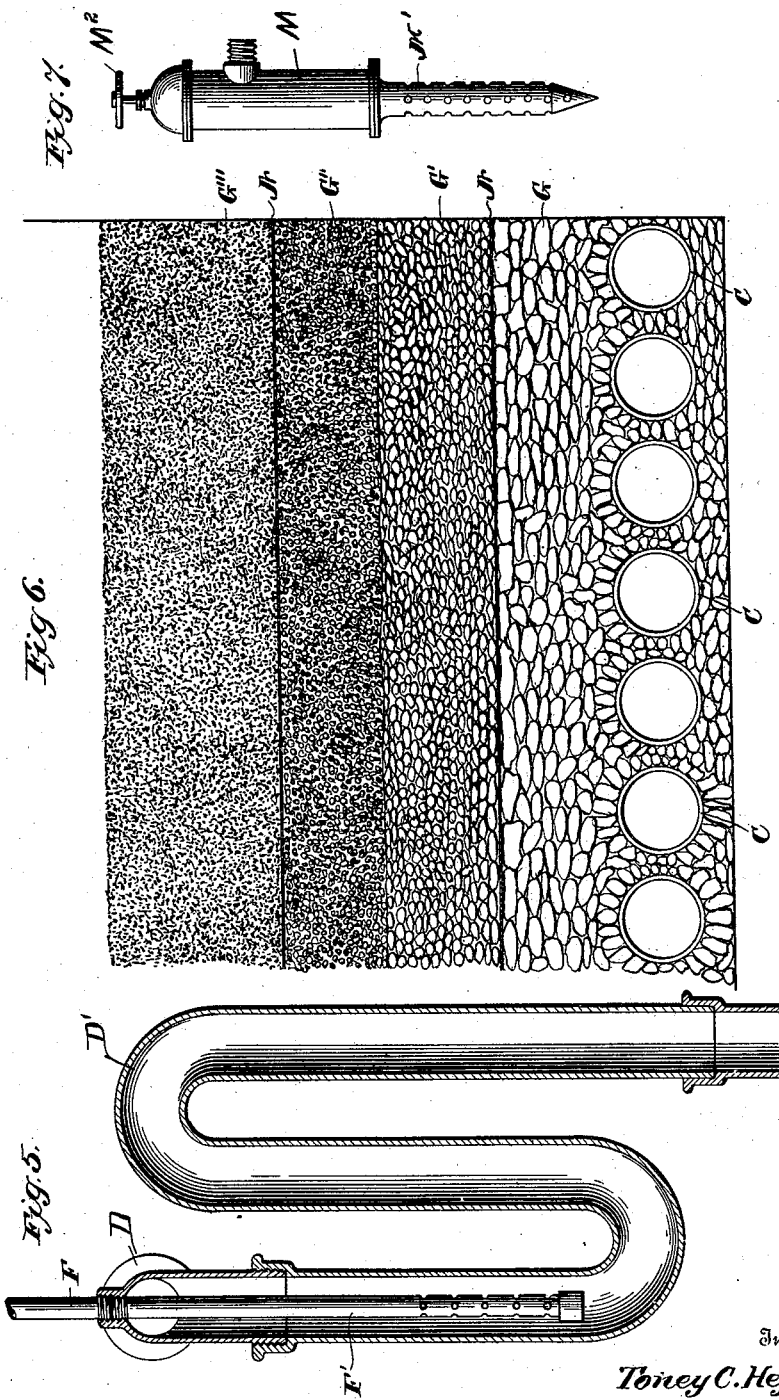

UNITED STATES PATENT OFFICE.

TONEY CHARLES HEFEL, OF MUNCIE, INDIANA, ASSIGNOR OF ONE-HALF TO CHARLES H. RUSSEY, OF SAME PLACE.

FILTERING PLANT FOR WATERWORKS.

SPECIFICATION forming part of Letters Patent No. 603,483, dated May 3, 1898.

Application filed July 19, 1897. Serial No. 645,130. (No model.)

*To all whom it may concern:*

Be it known that I, TONEY CHARLES HEFEL, a citizen of the United States, residing at Muncie, in the county of Delaware and State of Indiana, have invented certain new and useful Improvements in Filtering Plants for Waterworks; and I do hereby declare the following to be a full, clear, and exact description of the invention, such as will enable others skilled in art to which it appertains to make and use the same.

This invention relates to a new and useful improvement in filtering plants for waterworks; and it consists in the construction and arrangement of parts hereinafter described, and definitely pointed out in the claims.

My invention relates to improvements in filter-beds used in connection with city waterworks or where a large amount of water is to be filtered daily; and the objects of my invention are to construct a filtering plant with large filter-beds arranged on different planes, passing the water through them by gravity, to provide means for heating the water as it passes from one bed to another, and, further, arranging the mechanism so that it can be easily and perfectly cleaned. These and other objects not hereinbefore mentioned are accomplished by the construction illustrated in the accompanying drawings, wherein like letters of reference indicate corresponding parts in the several views, and in which—

Figure 1 is a top plan view of the filter-beds with the filtering material removed and the flush-pipes omitted in section 2 and showing parts in section. Fig. 2 is a vertical longitudinal section of Fig. 1 on the line $x\ x$. Fig. 3 is a cross-section on the line $xx\ xx$, Fig. 1. Fig. 4 is a cross-section on the line $xxx\ xxx$, Fig. 1, and Figs. 5, 6, and 7 are detail views.

In constructing my filter plant I find it advisable to construct the basins double and arranged side by side, so that one can be flushed and cleaned while the other is still in use. I have shown this construction in the drawings; but it is obvious that one set of filtering-basins would be sufficient in some cases.

In the drawings, A designates the side walls; A', the base, and A'' the dividing wall, separating the filtering-basins longitudinally.

In the drawings I have shown but two sets of filtering-basins, although it is obvious that any number may be used. I have designated these two sets as section 1 and section 2, respectively.

At the forward end of section 1 is placed a receiving-basin B, into which the water-supply is pumped through the supply-pipe B'. Between this basin B and section 1 is a screened opening B'', through which the water passes over into the first filter-bed. The base or floors A' of the filtering-basins incline downwardly toward the forward end thereof and are covered with soft drain-tiles C. These tiles or pipes are arranged in rows and are constructed in sections arranged end to end, as plainly shown in Figs. 1 and 2.

Arranged above the soft tiles is a layer of broken soft sandstone G, as shown in Fig. 6. Above this is a layer of coarse gravel G', nut size. Above this is a layer of gravel G'', pea size, and over this, forming the top layer, is a layer of fine lake-sand G'''. The different layers are separated by a perforated screen N.

At the rear end of section 1 is constructed an arch I, in which the rear ends of the drain-tiles empty, as shown in Fig. 2. The arch I is provided with manholes I', Figs. 2 and 4, through which an operator with a hose can pass and flush and clean each row of tiles separately. The filtering-basins can be further flushed and cleaned by means of the vertical perforated pipes I'' and horizontal perforated pipes I''', which are arranged within the basins. These perforated pipes are connected with a high-pressure pipe-line H by means of the laterally-arranged pipes H', which are provided with valves H'' for controlling each pipe. I provide an additional means of flushing and cleaning consisting of a nozzle M, provided with a perforated point M' and a valve M'' for controlling the water passing through the nozzle. The nozzle is connected by a hose (not shown) to the branch pipe $h$. This perforated point can be inserted at will at different places in the filtering material and water forced through it similar to the operation of cleaning by the perforated pipes I'' and I'''. When the filtering-basins are being flushed, the water can be drawn off through the drain-pipe J, as hereinafter described.

The water in the arch I is conducted therefrom by means of the pipes D, which extend down to near the bottom of the settling-basins E. The settling-basins are provided with the same kind of filtering material as the filtering-basins with the exception of the drain-tiles. The water rises up through this filtering material through the screens E' into section 2. The water in passing from the arch to the settling-basin E is heated by having steam forced in the pipes D. This is accomplished by means of the steam-pipes F, one for each pipe. The end of the pipes F are perforated at F', as shown in Fig. 5, and the pipe D is provided with an elbow D', so that the steam will more readily heat the water as it passes through the pipes. The pipes F are connected to a main steam-supply pipe F'' and are provided with valves F''', one for each pipe. The supply-pipe F'' is provided with a valve F'''' for shutting off either one of the basins.

The filtering material in the second section is the same as in section 1 and the water passes through the tiles C into the pipes D'''', which lead to near the bottom of the second settling-basin E'', which is also provided with filtering material, with the exception of the tiles. The water rises in this basin and passes into the clear-water basins O through the screens O'. The water is now thoroughly filtered and ready for use.

At the rear end of section 2 I show another way of cleaning the tiles, which consists of the cross-pipe D''', which is connected to the high-pressure pipe H and is provided with a valve d for regulating the supply of water to the said pipe, and the branch pipes d', leading from the pipe D''', the branch pipes being provided with the downwardly-extending portion d'' and horizontal portion d''', extending into the tiles, there being one branch pipe for each tile. When water is turned into the pipe D''', each tile will receive a stream and thoroughly wash and flush each tile.

D'' designates valves for each branch pipe. Extending upwardly from the downwardly-extending portions d'' of the branch pipes d' are vent-pipes D'''', which extend above the top of the filter and are controlled by the valves d''''. These pipes are left open as air-vents and are closed when the basin is being flushed.

As before described, when the filtering-basins are being flushed the surplus water is drawn off through the pipe J. This pipe is connected to the forward end of sections 1 and 2 of the filtering-basins and also with the settling-basin E, as shown in Fig. 2. The connection is the same in all three places, and a description of one connection will suffice for all. The opening from the basin to the pipe J is controlled by a valve J', which has a stem J'', extending above the filter, and a hand-wheel J''' on the stem. The valve is protected by a screen K', and a casing K surrounds and protects the valve-stem and also acts as a manhole if the valve needs repairing. By having the base A' incline downwardly toward the forward end of the basin all the water will run toward the opening for the pipe J and all the water can naturally be drained off. The pipe J leads into a vat l, located beneath the second settling-basin E''. The filtering material in the basin is prevented from falling into the vat by means of the screen e. The clear-water basin is also connected to the vat by means of the pipe J.

Located in the vat is a centrifugal pump L', which is adapted to empty the vat when the filtering plant is being flushed and cleaned, the water being forced up and out through the pipe L''. The pump is operated by means of the rod L''', which has a power-pulley L'''' on its upper end, and the parts are protected by the casing L.

In the operation of the filtering plant the water is filtered by force of gravity downwardly through the filtering-basins and upwardly through the settling-basins, and after leaving the first filtering-basin it is thoroughly heated by means of the steam, which adds greatly to the filtering capacity of the plant. Of course it will be understood that the supply of water to be filtered is cut off when the plant is being flushed through the flush-pipes.

I am aware that many minor changes can be made in the construction and arrangement of parts without in the least departing from the nature and principles of my invention.

Having thus described my invention, I claim the following and desire to secure the same by Letters Patent:

1. In a water-filtering plant, a filtering-basin having an inlet and outlet, one or more layers of filtering material placed therein, and porous pipes arranged on the bottom of the filter connected with the outlet.

2. A water-filtering plant consisting of filtering-basins connected to and communicating with each other, each bed having one or more layers of filtering material placed in them, the bottom of each basin being covered with rows of soft drain-tile, as and for the purpose set forth.

3. A water-filtering plant having stationary and portable flush-pipes connected and arranged in the filter-beds and a sewer or drain tile arranged and connected by a valve to form an outlet or drain for the said filter-beds, as and for the purpose set forth.

4. A water-filtering plant having two or more filtering-basins, the said basins connected together by pipes, steam admitted in the said pipes for heating the water as it passes through from one filter-bed to another, all as and for the purpose set forth.

5. A water-filtering plant having two or more filtering-basins the said basins being connected together by pipes, and means for heating the water in the pipes as it passes from one basin to another.

6. In a water-filtering plant having two or more filtering-basins, the said basins being connected together by pipes, an elbow in the pipes, and a perforated steam-pipe in the connecting-pipes.

7. A water-filtering plant having a filtering-basin, flush-pipes arranged in the basin, a drain-pipe leading from the bottom of the basin, a valve for controlling the drain-pipe provided with a stem leading to the outside of the basin and a screen surrounding and protecting the valve.

8. A water-filtering plant having a series of filtering-basins arranged on different planes, a drain-pipe leading from the lower portions of the basins, a vat beneath the basin into which the drain-pipe leads, a pump arranged in the vat, and connecting means extending to the outside of the basin for operating the pump.

9. A water-filtering plant having a filtering-basin, an arch arranged at the rear end of the basin and provided with a manhole and porous pipes arranged in the basin having one of their ends leading into the arch.

10. In a filtering plant, the combination with a filtering-basin, a second filtering-basin arranged on a lower horizontal plane than the first basin, a settling-basin arranged on a lower horizontal plane than the first basin and interposed between the two filtering-basins, and a pipe leading from the bottom of the first filtering-basin to a point adjacent the bottom of the settling-basin.

11. In a filtering plant, the combination with a filtering-basin, a second filtering-basin arranged on a lower horizontal plane than the first basin, a clear-water basin arranged on a lower horizontal plane than the second filtering-basin, a settling-basin interposed between the two filtering-basins and on a horizontal plane lower than the first filtering-basin, a pipe leading from the bottom of the filtering-basin to a point adjacent the bottom of the settling-basin, a settling-basin interposed between the second filtering-basin and the clear-water basin and on a horizontal plane lower than the said filtering-basin and a pipe leading from the bottom of the said filtering-basin to a point adjacent the bottom of the settling-basin.

In testimony whereof I affix my signature in presence of two witnesses.

TONEY CHARLES HEFEL.

Witnesses:
W. M. BIRCH,
J. W. RHOADS.